(12) United States Patent
McNabb

(10) Patent No.: US 8,176,993 B2
(45) Date of Patent: May 15, 2012

(54) RIPPER PLOUGH FOR SOIL TILLAGE

(76) Inventor: David H. McNabb, Edmonton (CA)

( * ) Notice: Subject to any disclaimer, the term of this patent is extended or adjusted under 35 U.S.C. 154(b) by 463 days.

(21) Appl. No.: 12/103,856

(22) Filed: Apr. 16, 2008

(65) Prior Publication Data

US 2008/0257576 A1    Oct. 23, 2008

Related U.S. Application Data

(60) Provisional application No. 60/911,992, filed on Apr. 16, 2007.

(51) Int. Cl.
*A01B 39/20* (2006.01)

(52) U.S. Cl. .................................. 172/730; 172/722

(58) Field of Classification Search ............ 172/730, 172/765, 722
See application file for complete search history.

(56) References Cited

U.S. PATENT DOCUMENTS

| | | | | |
|---|---|---|---|---|
| 102,789 A | * | 5/1870 | Eppes | 172/724 |
| 104,754 A | * | 6/1870 | Miner | 172/730 |
| 1,032,291 A | * | 7/1912 | McCollum | 172/722 |
| 1,084,153 A | * | 1/1914 | Lauer | 172/724 |
| 1,137,162 A | * | 4/1915 | Mosely | 172/725 |
| 1,499,531 A | * | 7/1924 | Hoeregott | 172/730 |
| 1,569,271 A | * | 1/1926 | Ewasen | 172/722 |
| 2,266,818 A | * | 12/1941 | Seaholm | 172/722 |
| 2,337,777 A | * | 12/1943 | Seaholm | 172/722 |
| 4,204,348 A | | 5/1980 | Lydie | |
| 4,207,952 A | | 6/1980 | Van Natta | |
| 4,275,792 A | | 6/1981 | Jensen et al. | |
| 4,408,667 A | * | 10/1983 | Jarvis | 172/722 |

(Continued)

FOREIGN PATENT DOCUMENTS

CA    806933 A    2/1969

(Continued)

OTHER PUBLICATIONS

Terzaghi, K., and R. B. Peck., "Soil mechanics in engineering practice: Article 27: States of Plastic Equilibrium", $2^{nd}$ Ed. John Wiley & Sons, Inc., New York, (1967), pp. 1, 187-193, available 1967.

(Continued)

*Primary Examiner* — Thomas B Will
*Assistant Examiner* — Joel F. Mitchell
(74) *Attorney, Agent, or Firm* — Davis & Bujold P.L.L.C.

(57) ABSTRACT

A ripper plough for soil tillage includes a body having an upper mounting attachment end, a lower soil engaging end, a leading edge, a trailing edge, and opposed sides. A ploughshare support extends outwardly from the body from the leading edge toward the trailing edge at a plough angle of between 40 degrees and 55 degrees and extends outwardly and downwardly relative to the body at a thrust angle of between 40 degrees and 50 degrees. Ploughshares are mounted on the ploughshare support. The ploughshares have a length between a leading edge and a trailing edge of at least 1.5 feet and are spaced apart at the trailing edge by at least two feet, to provide an average lift angle of upward lift of between 10 degrees and 15 degrees.

9 Claims, 6 Drawing Sheets

U.S. PATENT DOCUMENTS

| | | | | |
|---|---|---|---|---|
| 4,457,381 A | * | 7/1984 | Wetmore | 172/722 |
| 4,461,355 A | * | 7/1984 | Peterson et al. | 172/156 |
| 4,538,689 A | | 9/1985 | Dietrich, Sr. | |
| 4,645,013 A | * | 2/1987 | Edmisson | 172/730 |
| 4,850,434 A | | 7/1989 | Rubemeyer et al. | |
| 5,040,616 A | | 8/1991 | Hake | |
| 5,050,685 A | | 9/1991 | Harrison | |
| 5,215,150 A | | 6/1993 | Wilkins | |
| 5,373,904 A | * | 12/1994 | Sanders | 172/730 |
| 5,415,236 A | | 5/1995 | Williams | |
| 5,540,288 A | * | 7/1996 | Dietrich, Sr. | 172/196 |
| 6,276,462 B1 | * | 8/2001 | Dietrich, Sr. | 172/138 |
| 6,328,114 B1 | | 12/2001 | Ritchie et al. | |
| 7,086,184 B2 | | 8/2006 | Archuleta, Jr. et al. | |
| 7,770,657 B2 | * | 8/2010 | Poutre | 172/724 |

FOREIGN PATENT DOCUMENTS

| | | |
|---|---|---|
| CA | 1 148 405 | 6/1983 |
| DE | 27 40 510 A1 | 3/1979 |
| JP | 2004-000247 | 1/2004 |
| JP | 2004-229574 | 8/2004 |
| RO | 110613 B1 | 2/1996 |
| SU | 608496 | 5/1978 |
| SU | 940 661 | 7/1982 |

OTHER PUBLICATIONS

Hettiaratchi, D. R. P., "Theoretical soil mechanics and implement design", Soil & Till Research, 11 (1988), pp. 325, 328, 334, available 1988.

McNabb, D. H., and S. D. Hobbs., "Shallow tillage fails to increase 5-year growth of ponderosa pine seedlings", Northwest Science, vol. 63 No. 5 (1989), pp. 241 & 243, available 1989.

Davis, S., "Effectiveness of a winged subsoiler in ameliorating a compacted clayey forest soil", Western Journal of Applied Forestry, vol. 5 (1990), p. 138, available 1990.

McNabb, D. H., "Tillage of compacted haul roads and landings in the boreal forests of Alberta, Canada", Forest Ecology and Management, 66 (1994), pp. 179 & 188, available 1994.

Dunker, R. E., C. L. Hooks, S. L. Vance, and R. G. Darmody., "Deep tillage effects on compacted surface-minded land", Soil Sci. Soc. Am. J. 59 (1995), pp. 192 & 193, available 1995.

Raper, R. L., "Force requirements and soil disruption of straight and bentleg subsoilers for conservation tillage systems", Applied Engineering in Agriculture vol. 21 (5), (2005), cover page & p. 6, available 2005.

* cited by examiner

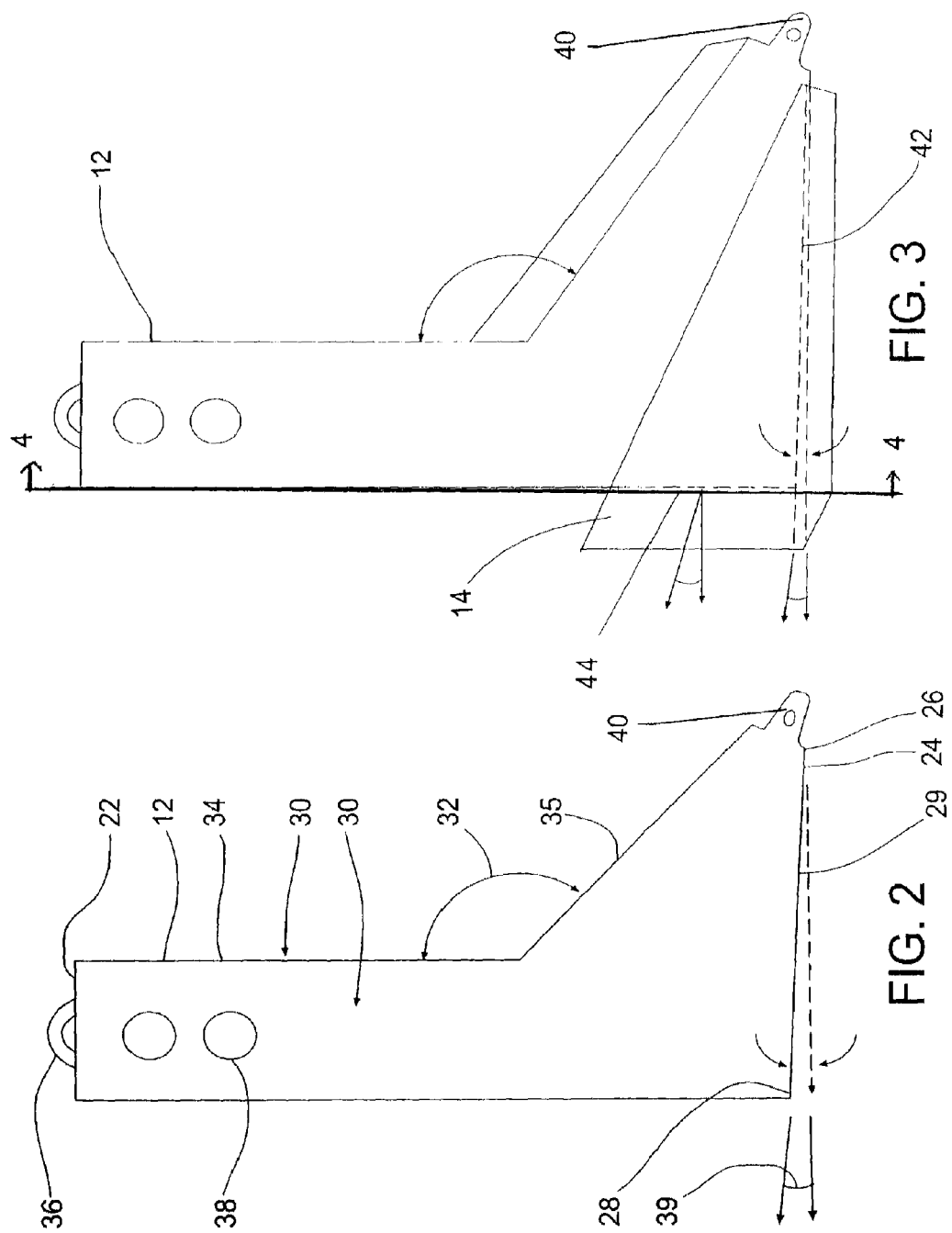

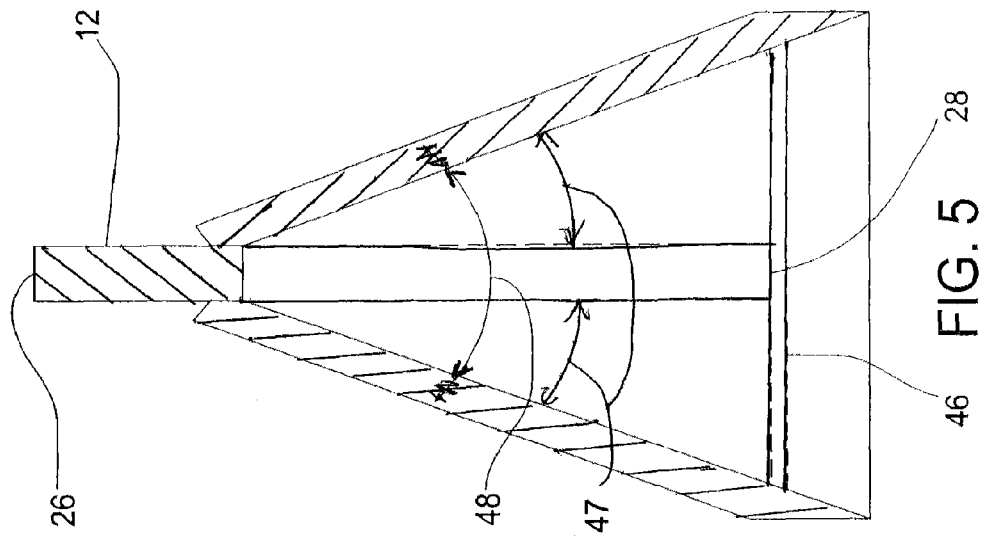
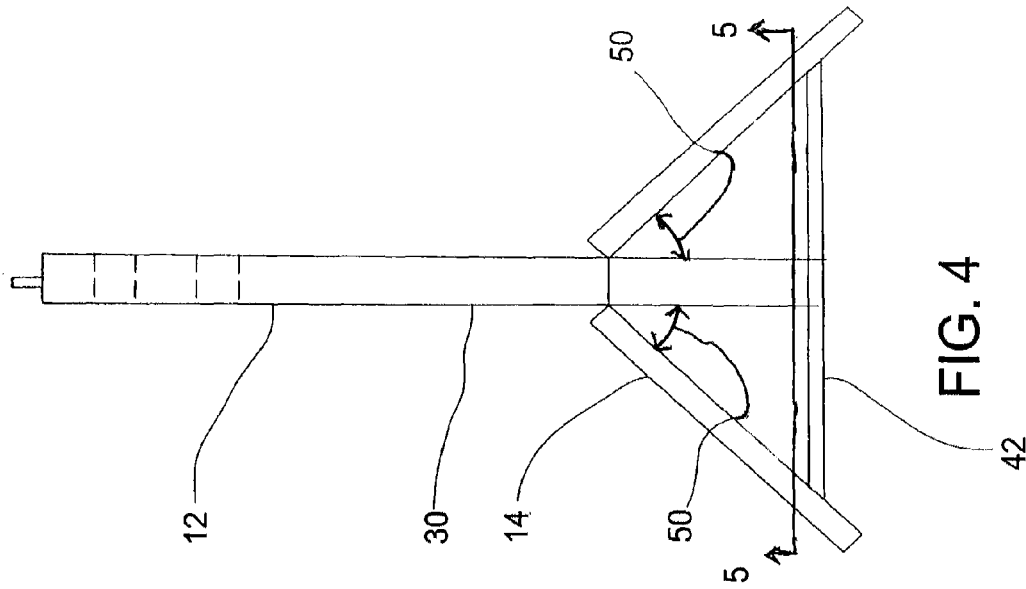

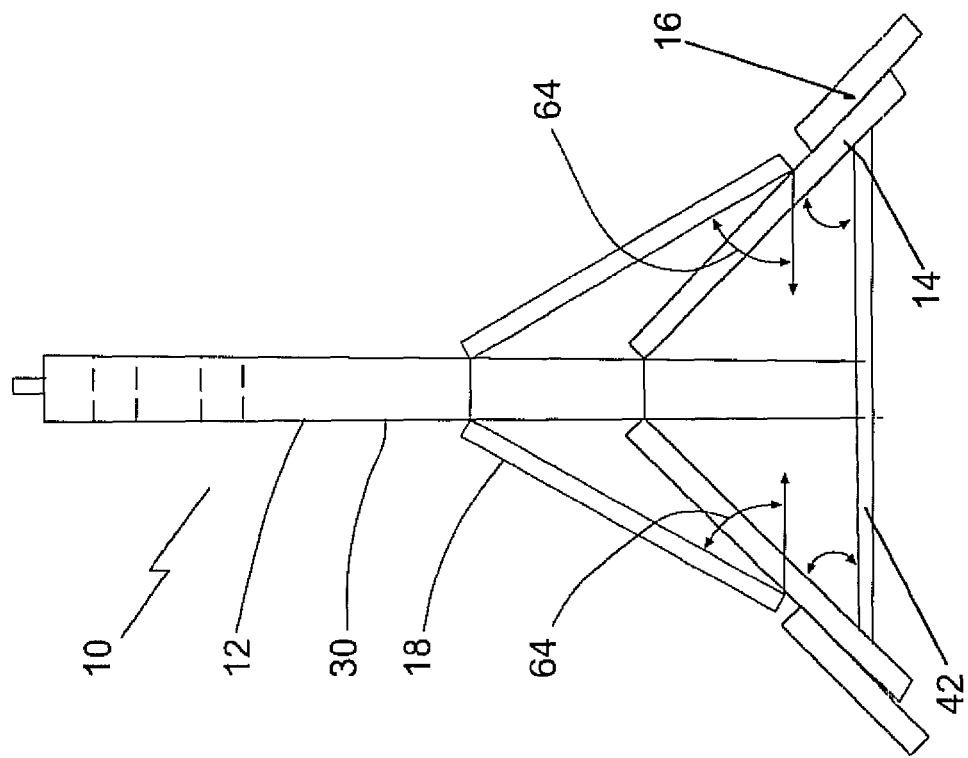
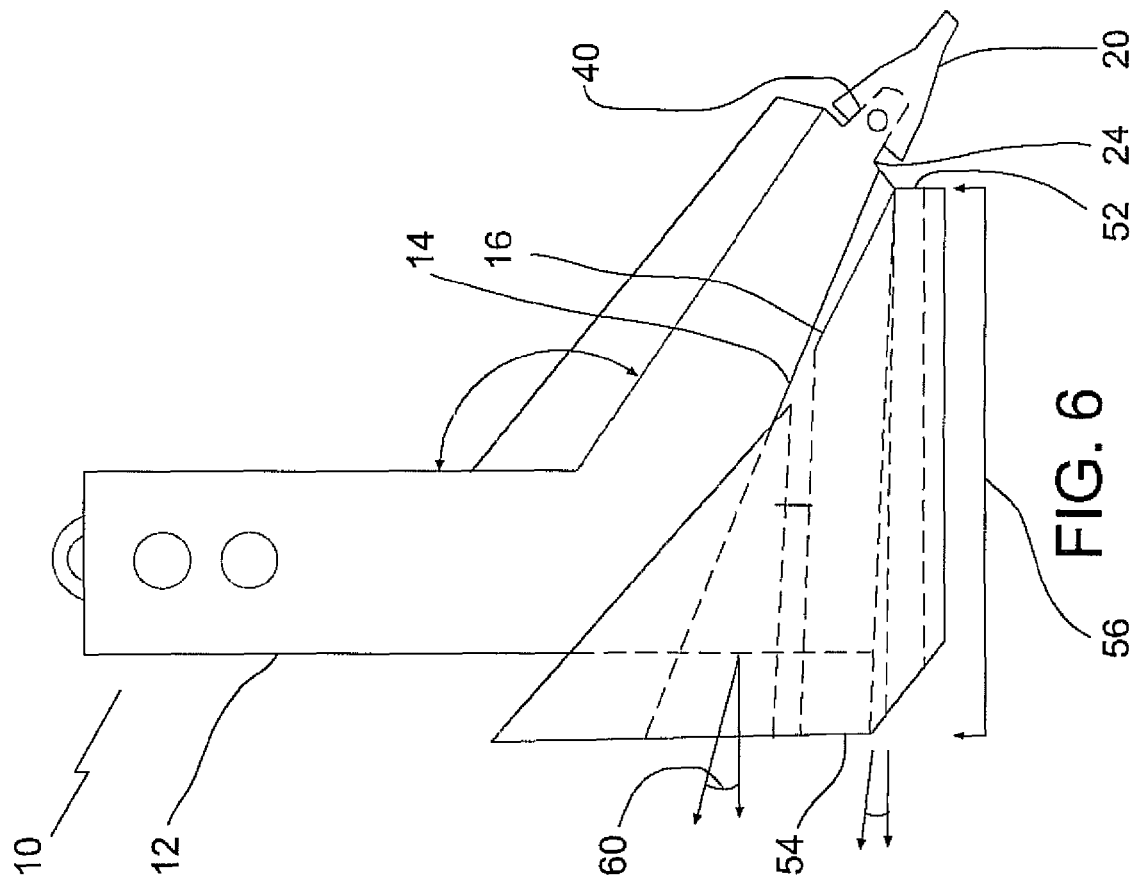

$\alpha_{p_1}$ - fracturing laterally beyond plowshare in drier soil.
$\alpha_{p_2}$ - fracturing laterally beyond plowshare in wetter soil.
$\alpha_{p_1} > \alpha_{p_2}$

RIPPER PLOUGH FOR SOIL TILLAGE

FIELD

The present application relates to a ripper plough for soil tillage, specifically, a ripper plough that minimizes the loss of the surface soil layer for use where deep tillage of the subsoil or loosening of specific shallow soil layers is desired.

BACKGROUND

To increase production, tillage practices have become more sophisticated in the past century, including increasing the depth of tillage and numerous specialized implements to create a desirable seed bed and control unwanted vegetation. With the evolution and use of large agricultural machines came detrimental impacts to soil below the normal depth of tillage. These impacts included compaction, shearing of soil during wheel-slip, and rutting/sinking of tires into the soil, which altered natural soil structure impeded the flow of water and air into and through the soil, and the penetration of the soil by roots. As the size of the machines increased, so did the depth and severity of the adverse impacts to soil by trafficking. The subsoil can take several decades, and sometimes more than a century to recover from the adverse impacts due to a single period of trafficking.

The temporary use of agricultural, forest, and range lands for industrial purposes such as oil and gas exploration and extraction, mining for minerals, and the facilities and infrastructure to access these developments can also severely impact soil productivity and the type and sustainability of the plant community returned to industrial sites once they are reclaimed and returned to their original owners. Hence, deep tillage of these types of sites is probably more important than it is to lands used by modern agriculture. In the majority of the cases, the implements used to till reclaimed soil are larger versions of those used in modern agriculture, which generally have developed from a common scientific basis. As a result, the depth of tillage is relatively shallow, and the soil condition when they are effective in loosening soil is a narrow window, which in some climates may not exist.

A variety of inventions for tillage of soil below the normal plough layer tilled in agricultural practice have been developed, include shanks with special points, tines, sweeps, or wings, which are designed to efficiently move through the soil while loosening the soil above the soil engaging, leading edge of the implement. The primary forces imparted to soil by deep subsoiling inventions focus most of the energy in the forward and vertical axes; only a few such as paraploughs for example exert a lateral force on the soil as well. Regardless, the principle method of tillage is to use a relatively thin narrow blade to slice through the soil as a specific depth and raise the soil a short distance before the soil is allowed to fall over the backside of the blade. The fall from the back of the blade causes a tensile failure of the soil because the tensile strength of soil can be very low compared to its compressive or shear strength. When ripper ploughs, include wings or sweeps on the shank, the included angle is generally much greater than 90 degrees, which maintains most of the tillage energy concentrated in the direction of travel and vertical planes. These types of equipment are highly effective to depths of 40 to 50 cm when the soils have only been compacted but still retain much of its natural structure and the entire soil profile is relatively dry.

The natural structure of soil creates planes in soil which become the most likely zones of fracturing during tillage to produce tensile failure in soil. Severe compaction and shearing of soil during slip of wheels and tracks of machines working near their maximum capability destroy, at least some if not all of the natural structure of soil. The destruction of soil structure creates a homogenous blend of soil particles, which is commonly referred to as massive soil, or a soil with massive structure. These conditions are common during reclamation of industrial sites when ground-engaging equipment are used to move wetter soil.

Massive structure of cohesive soil and/or wetter soil severely limits the effective depth that conventional tillage implements can till subsoil. Several factors contribute to this deficiency. Deep tillage is ineffective under these conditions because of the primary reliance on tensile failure in the two dimensional planes of direction of travel and vertical lift. In these conditions, passive pressure form of earth pressure theory applies, or only a small zone of active press develops immediately around a shank. As a result of passive pressures in the soil around the ground engaging portions of a subsoiler, the fracture plane from its outer edge to the soil surface is normally an angle less than 45 degrees from vertical. Hence, the depth that the soil engaging portion of a subsoiler is operated is nearly always greater than the width of the soil loosened at the surface. As soil becomes more massive and/or wetter, the more likely the soil will generally deform and flow around the shank and ground-engaging portions of subsoilers. In these situations, it is not uncommon for subsoilers to only form slits in the soil around the shank and ground engaging tines, wings, and sweeps, and the volume of soil is limited to a small "V-shaped" area of soil immediately around the shank. Numerous examples of these types of soil fracturing patterns and failure of conventional equipment to till massive and/or wetter soil can be found in the soil and reclamation scientific literature.

Relatively recent research in unsaturated soil strength is also providing additional information on why conventional subsoilers have a narrow window of effectiveness in cohesive, finer-textured soils. These soils become more brittle as they dry and have higher soil strength than the same soil when wet. Drying can also cause shrinkage which can separate soil structural units. These factors cause the soil to reach maximum strength and fail at relatively low strain. Strain is defined as the ratio of change in volume or lateral displacement of soil relative to its total volume or length of the soil unit. These attributes of soil strength contribute to the relatively easy failure of soil by tensile failure when tilled with wings or sweeps on subsoilers with low angles of lift. As soil moisture increases, the amount of strain or soil displacement required to fail increases. In dry soil, a soil may fail at a strain of only a few percent, whereas wet soil can be deformed by a strain of between 10 to 20 percent before it fails. Hence, wet soil requires a much higher rate of strain to fracture into clods.

U.S. Pat. No. 5,415,236 (Williams) entitled "Subsoiler Having Rearwardly Disposed Soil Fracturing Structure" describes a subsoiler having shank assemblies that cut a slice in the soil without causing an eruption of the soil in a turbulent manner ahead of the shank line.

SUMMARY

There is provided a ripper plough for soil tillage which includes a body having an upper mounting attachment end, a lower soil engaging end, a leading edge, a trailing edge, and opposed sides. A ploughshare support extends outwardly from the body toward the leading edge toward the trailing edge at a plough angle of between 40 degrees and 55 degrees and extends outwardly and downwardly relative to the body at a thrust angle of between 40 degrees and 50 degrees. Ploughshares are mounted on the ploughshare support. The ploughshares have a length between a leading edge and a trailing edge of at least 1.5 feet and are spaced apart at the trailing edge by at least two feet, to provide an average lift angle of upward lift of between 10 degrees and 15 degrees.

BRIEF DESCRIPTION OF THE DRAWINGS

These and other features will become more apparent from the following description in which reference is made to the appended drawings, the drawings are for the purpose of illustration only and are not intended to be in any way limiting, wherein:

FIG. 2 is a side elevation view of the body of the ripper plough from FIG. 1.

FIG. 3 is a side elevation view of the body from FIG. 2 with a ploughshare support attached.

FIG. 4 is a rear elevation view of the embodiment of FIG. 3 along section line 4-4 of FIG. 3.

FIG. 5 is a bottom elevation view of the embodiment of FIG. 3 along section line 4-4 of FIG. 4.

FIG. 6 is a side elevation view of the ripper plough from FIG. 1.

FIG. 7 is a rear elevation view of the ripper plough from FIG. 1.

DETAILED DESCRIPTION

Figure 1:
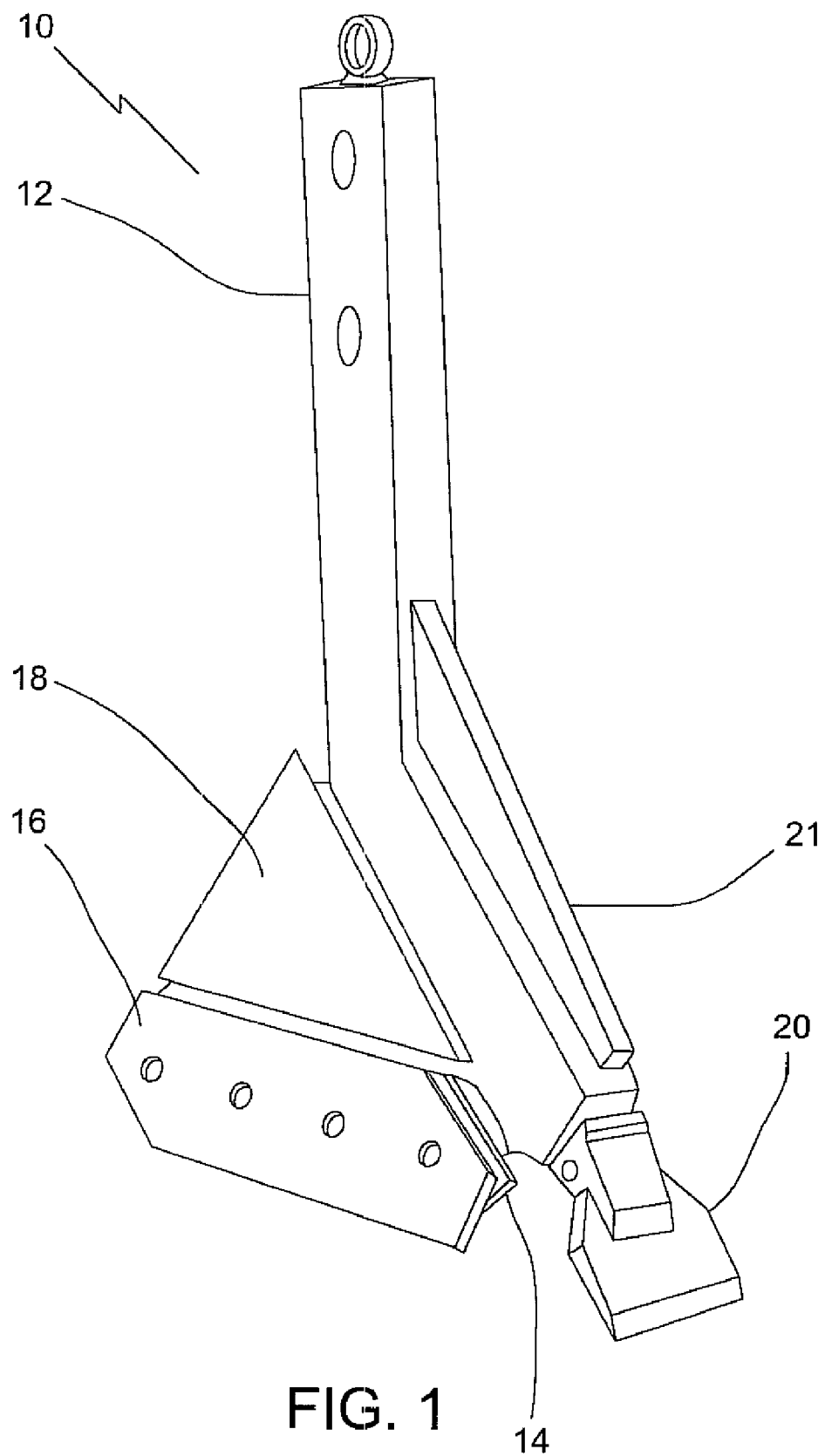
FIG. 1 is a perspective view of a ripper plough.

A ripper plough for soil tillage generally identified by reference numeral 10, will now be described with reference to FIGS. 1 through 10.

Referring to FIG. 1, a ripper plough 10 for soil tillage consists of a body 12, a ploughshare support 14, ploughshares 16, mouldboards 18, a soil-engaging point 20, and a coulter 21. Referring to FIG. 2, body 12 has an upper mounting attachment end 22, a lower soil engaging end 24, a leading edge 26, a trailing edge 28, a bottom edge 29, opposed sides 30, and a coulter angle 32. Body 12 is a shank 34. Body 12 may be a boot 35 adapted to slide over a shank 34. Upper mounting attachment end 22 has a lift loop 36 and holes 38. Holes 38 are used to match the mounting of ripper plough 10 in a tool bar of a tractor (not shown). Bottom edge 29 has a downward slope from trailing edge 28 toward leading edge 26. The downward slope of bottom edge 12 has an approach angle 39 of between five degrees and ten degrees. Referring to FIG. 6, lower soil engaging end 24 has a point 40 for attaching soil engaging point 20. Soil engaging point 20 is detachably secured to lower soil engaging end 24 of body 12. Soil engaging point 20 is replaceable, and may be a common tooth used on soil excavation equipment and the like. Referring to FIG. 2, coulter angle 32 denotes the angle along leading edge 26 between upper mounting attachment end 22 and lower soil engaging end 24. Coulter angle 32 may be between one-hundred and twenty degrees and one-hundred and fifty degrees.

Referring to FIG. 3, ploughshare support 14 includes a base plate 42, and lower back brace(s) 44. The base plate 42 extends perpendicular to the body 12. An upper edged of the ploughshare support 14 is attached to the body 12 and to an outer edge of the base plate 42. Referring to FIG. 5, ploughshare support 14 may also have a lower end brace 46 near trailing edge 28 of body 12. The ploughshare supports 14 both extend outwardly from body 12, from leading edge 26 toward trailing edge 28, and form a combined plough angle 48 of between forty degrees and fifty-five degrees between inwardly facing surfaces thereof, e.g., the plough angle 47 formed between each ploughshare and the body 12 is between 20 and 27.5 degrees. Referring to FIG. 4, ploughshare support 14 also extends outwardly and downwardly relative to body 12 at a thrust angle 50 of between forty degrees and fifty degrees. The thrust angle 50 is the acute angle formed between the body 12 and the plowshare support 14 and measured perpendicular, or at a right angle, to the direction of travel. Lower back brace is 44 attached to base plate 42 and opposed sides 30 of body 12.

Figure 8:
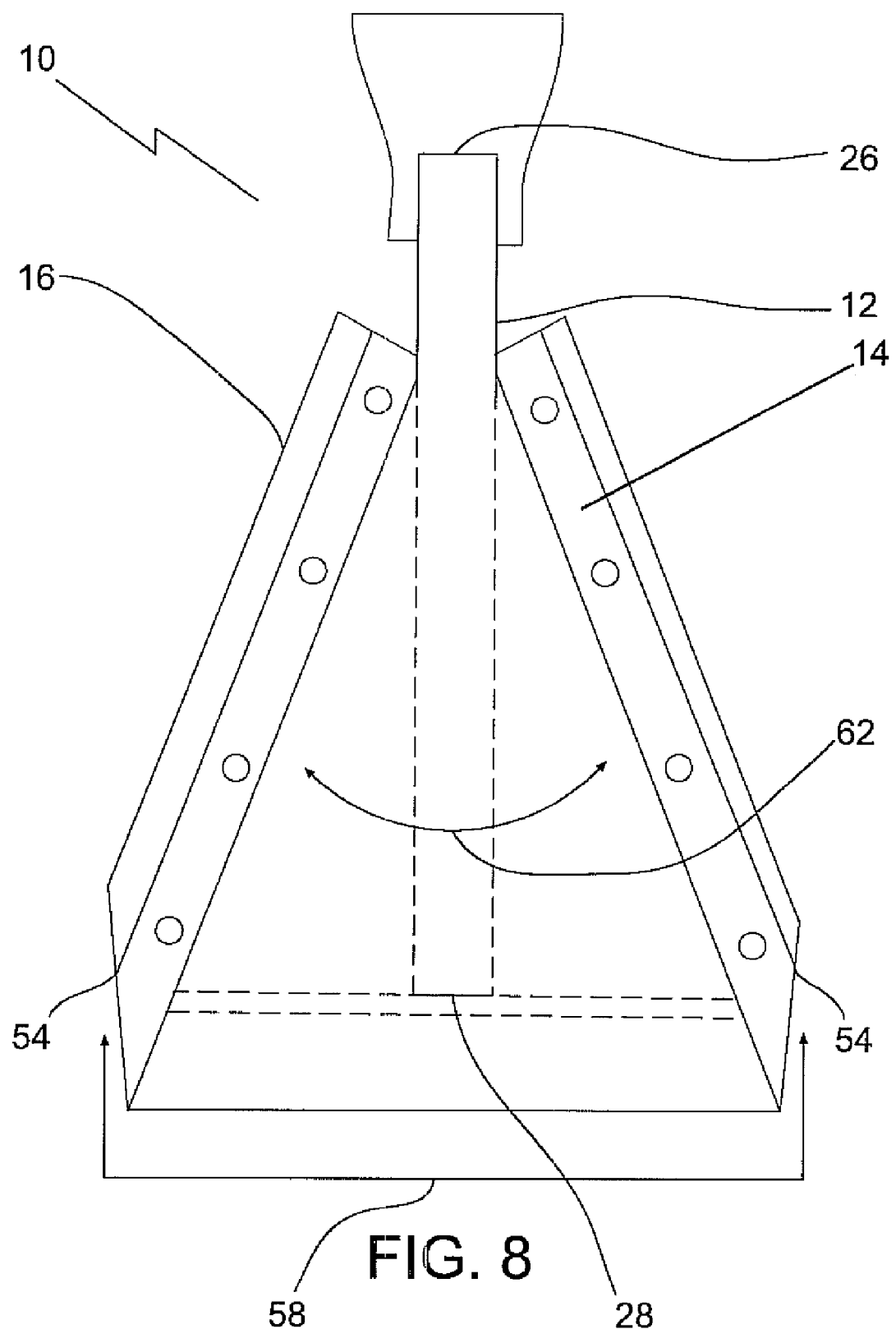
FIG. 8 is a bottom elevation view of the ripper plough from FIG. 1.

Referring to FIG. 6, ploughshares 16 may be mounted on ploughshare support 14. Ploughshares 16 have a leading edge 52, a trailing edge 54, and a length 56. Length 56 is the distance between leading and trailing edges 52 and 54, respectively. Length 56 is at least 1.5 feet, but actual length is dependent upon the size of equipment that will be used to pull the ripper plough. Referring to FIG. 8, ploughshares 16 are spaced apart at trailing edge 54 by a distance 58 of at least two feet, Referring to FIG. 6, ploughshares 16 provide an average lift angle 60 of upward lift of between ten degrees and fifteen degrees. Ploughshares 16 are detachably secured to ploughshare support 14.

Referring to FIG. 7, mouldboards 18 are secured to opposed sides 30 of body 12 and plowshare support 14. Lower edge of mouldboard is attached to the plowshare support 14 above the plowshare 16 Referring to FIG. 7, mouldboards 18 extend outwardly and downwardly relative to body 12 at an angle 64 of between fifty degrees and sixty degrees.

By applying a more lateral force (a force applied perpendicular to the direction of travel) to soil at the soil engaging face, the active pressure form of earth pressure theory causes the soil to fracture laterally as well as vertically. Hence the fracture plane of the soil away from the soil engaging face of the subsoiler would initially be a failure plane with an angle greater than 45 degrees from the vertical, and the shape of the tilled furrow of soil would be of a much wider "U-shaped" area in cross-section. Ripper plough 10 described herein was designed to optimize active earth pressures to greatly increase the volume of soil effectively loosened at the maximum depth of tillage, and to increase the strain on soil so that it will fail and fracture over a much wider range of soil moisture than conventional subsoilers. Ripper plough 10 was also designed to till through multiple soil layers and minimize the mixing of those layers.

One of the primary objectives of ripper plough 10 is to increase the volume of soil tilled near the bottom of the tillage zone across a wide range of soil moisture and soil conditions. It is intended to be beneficial for tilling subsoils where deep soil layers are restricting biological activity, soil aeration and hydrology, or plant production. Ripper plough 10 is specifically intended to be used to treat soils that are being reclaimed and environments where soils tend to be wet during operations or during tillage, however, other uses include wherever mixing or loosening of a specific depth of soil is required, such as in construction of roads. The effectiveness of ripper plough 10 may be increased when it is mounted on bulldozers with adjustable-parallelogram rippers, which provide accurate control of the depth that ripper plough 10 will operate in the soil as well as to provide forward and backward tilt of plough 10 to improve its effectiveness according to soil type and conditions, such as soil water content and massive structure.

The primary application of ripper plough 10 is for the tillage of subsoil while minimizing the displacement of top-soil from the surface. The applications include restoring soil productivity by soils impacted by industrial uses of soils for purposes other than for biological productions of plants, as well as naturally occurring soils that have restrictive soil layers deeper in the soil profile. However, ripper plough 10 has other applications where thorough tillage of specific depths of soil is required such as in the construction of road subgrades where soil may be too wet or dry to be successfully compacted, or where chemical additives are mixed into the soil. Ripper plough 10 can also be used to loosen soil in advance of scrapers and the like, that load and transport soil for the construction of earth works. The broad base of bottom edge 29 of ripper plough 10 with the precise control of the depth and approach angle 39 with the appropriate machine, is thought to be much more effective at loosening the soil layer of concern than conventional equipment and practices.

The embodiment shown in FIGS. 1-8 has an integrated shank 34, ripping and plowing parts for attachment directly to prime movers such as bulldozers, wheeled or tracked tractors, and similar machines. On wheeled or tracked machines, ripper plough 10 is most efficient when used in pairs but can be used as a single unit. When operated in pairs, mounting ripper plough 10 directly behind the wheels or tracks maximizes the loosening of the soil without re-compacting the soil. Ripper plough 10 could also be used as a tillage implement on excavators and backhoes. Other embodiments may be designed with a similar ripping and plowing configuration to slide on commercially available shanks, or adapted to other shank configurations, for bulldozers, excavators, and the like.

Each unit of ripper plough 10 in the preferred embodiment has a shank 34 with a top end and a bottom end. The top end has holes, or other means, for removably connecting ripper plough 10 to the toolbar of the tractor. When connecting ripper plough 10 to a bulldozer, the simplest method is for the shank to be sized to fit the slot in the toolbar of the ripper of the dozer to be used for tilling soil. The connection is made using the same bolts, washers, and pins used to connect the commercial shank. A loop is shown on the top end of the shank for picking up ripper plough 10 and lifting it through the ripper slot on a bulldozer.

The bottom end of the shank is shown as a scalene triangle with the forward or leading edge of the triangle lower than the trailing edge of the unit. When operated in a vertical position, the angle at the bottom of the shank slopes upward at the trailing edge. This angle is the approach angle and is approximately 5 degrees, but can range between 0 and 10 degrees. The approach angle helps pull ripper plough 10 into the soil, but when greater than about 10 degrees requires more power from the tractor to pull ripper plough 10 through the soil at a constant depth. The approach angle can be altered if the tractor has an adjustable parallelogram ripper that is found on some bulldozers, for example. The upper side of the scalene triangle makes an obtuse angle of approximately 140 degrees, but generally ranging between 120 and 150 degrees, from the leading edge of the upright portion of the shank. This obtuse angle is the coulter angle, which helps the unit engage the soil at depth and separate the soil as it flows past the shank.

The bottom leading edge of the shank is a point for engaging the soil. The point is the zone of greatest wear from engaging the soil; hence, the durability of the unit is improved if the point is replaceable. Therefore, the point as shown has a hole traversing the shank and a shape to hold any of a number of commercially available ground-engaging teeth used on bulldozers, excavators, graders, and the like, and is attached to the point with the appropriate connectors.

The basic ripping and plowing unit consists of the previously described shank, a coulter welded to the leading edge of the shank upright and upper leading edge of the bottom scalene triangle. The purpose of the coulter is to split the soil profile so that it flows around the shank, deflect debris, and reduce abrasion of the shank. An abrasion resistant metal is preferred for the shank and coulter. These pieces and the other permanently attached pieces are attached by welding fabrication using the techniques and materials recommended by experts in the sciences of metal fabrication.

The basic unit further consists of a flat trapezoidal base, and is welded to the bottom of the shank so that the base is symmetrically position on the shank perpendicular to the direction of travel. The short length of the trapezoidal base is the width of the shank and is the leading edge. The equal-length sides of the base extent outward from the side of the bottom of the shank at an angle of approximately 48 degrees, referred to as the plow angle, but can vary between 40 and 55 degrees. The plow angle defines the lateral extension of the plowshares from the shank. Plow angles of less than 20 degrees increase friction on the sides of the shares relative to the volume of soil tilled, and plow angles greater than about 55 degrees increase the power required to pull a unit through soil to till at the same depth. The trapezoidal base is positioned rearward of the point of the shank and extends back of the trailing edge of the shank in its current illustration, but the rearward projection depends on the size of size of shank required to fit the tractor.

Attached to each side of the shank and base unit is the plowshare-base. The plowshare-base is shown as a five-sided polygon with the shortest and longest sides parallel. The short side is a minor improvement, but could be a four-sided polygon that comes to a point; however, the extra extension does not improve the effectiveness of the tillage achieved, increases the amount of power required to pull ripper plough 10 in the soil, and is highly susceptible to abrasive wear. The bottom, soil cutting edge of the plowshare-base is positioned below, and parallel, to the base. Hence, the soil cutting edge of the plowshare sub-base has the same approach angle to the soil as the base. The upper edge of the plowshare-base is attached to the shank at an angle of approximately 45 degrees to the base, and measured perpendicular to the direction of travel. The outward slope of the plowshare-base defines the thrust angle, which can vary between 40 and 50 degrees. The thrust angle provides sustained lateral pressure on the soil that create active rather than passive earth pressures in the adjacent soil, which produces a fracturing of soil extending at an acute angle outward and upward from the lower soil-engaging edge of the plowshare-base. The result is a "U-shaped" tillage furrow where the bottom of the furrow is the widest dimension of the plowshare-base (measured perpendicular to the direction of travel). Thus, ripper plough 10 produces a much greater volume of loosened soil than a conventional winged or sweep subsoiler operated at the same depth.

The lower soil engaging edge of the plowshare-base is parallel to the bottom of the shank and provides no further lift of the soil than that produced by the approach angle; however, the upper edge of the plowshare-base where it is connected to the side of the shank extends backward and upward at an angle of approximately 23 degrees. The average slope of the plowshare-base is upward at an angle of 11.5 degrees, which is defined as the lift angle. The horizontal length of the plowshare-base and the sum of the approach and lift angles provide the data to calculate a value of the average vertical lift produced in the soil by ripper plough 10.

A trapezoidal plate of metal with the top the width of the shank and the sides sloping downward at an angle of 45 degrees and a total width equal to the width of the base at the point that the trailing edge of the bottom of the shank joins the base completes the simplest form of ripper plough 10. As has been illustrated in this embodiment, this plate is welded to the base, shank and two plowshare-base units ensure that stability of the entire unit during use. It will be appreciated that the plate could consist of two or more pieces, instead of one.

It will be recognized that, during use, the plowshare-base is subject to a high level of abrasive wear on the lower soil engaging cutting edge and on the lower rear face of the piece. Thus, covering the edge and surface with more wear-resistant welds is required on a regular basis to maintain the effectiveness and durability of ripper plough 10. One alternative is to attach a replaceable plowshare to the plowshare-base with bolts and nuts. The lower soil-engaging edge of the plowshare extends lower than the plowshare-base in order to protect the plowshare-base from wear as well as the bolts and nuts attaching the plowshare to its base. In its simplest and most economical form, the plowshare is constructed from steel plate specifically manufactured from abrasion resistant steel for use as the lower soil-engaging edge of a bulldozer blade. The hole size and spacing in the plowshare-base are the same as that found in the dozer blade stock and the same fasteners that are used to connect the stock to a bulldozer blade are used to join the plowshare to the plowshare-base. The only modification of the dozer blade stock is cutting into an appropriate length if necessary, and cutting two opposing corners from a blade in such a way that forward leading upper corner fits more closely to the shank. This shape has several advantages, such as: reducing the lateral extension of the plowshare at the lower leading edge of the plowshare; reducing excessive frictional drag of the trailing lower edge; and extending the life of the plowshare by making them reversible. In use, the upper edge of the plowshare is less worn than the lower soil-engaging edge, which allows each unit to be removed and turned end-for-end and reattached, which nearly doubles the useful life of each plowshare.

The lower leading soil-engaging edge of the plowshares can be protected from directly hitting buried objects such as rocks by installing a wide, or flare tooth on the shank as the leading edge of the unit that always engages the soil first. A flare tooth is spade-like in shape with the forward edge approximately twice the width as the trailing end that connects to the shank. Flare teeth are commonly used as attachments to excavator buckets and are commonly available from companies providing ground-engaging attachments to the construction industry.

The basic form of the previously described invention, including the replaceable ground-engaging tooth and pair of ploughshares, is effective in tillage cohesionless and drier medium-textured cohesive soils that are not massive. Performance of ripper plough 10 in all massive soil and wetter cohesive soils is improved with the addition of a small moldboard directly above the ploughshare. The moldboard is welded directly to the ploughshare-base and the side of the shank, as well as by the use of a second plate in the rearward pocket formed by the trailing edge of the shank and the ploughshare-base and moldboard. The moldboard is an obtuse triangle shaped to fit the complex geometry of the ploughshare-base and shank. The trailing edge of the moldboard extends upward from its attachment point on the ploughshare-base just above the ploughshare at an angle of approximately 56 degrees. The purpose of the small moldboard is two-fold: to maintain some lateral thrust on the upper soil layer, and to minimize the loss of surface soil into the bottom of the furrow created by the shank. A steeper angle of attachment of the moldboard to the face of the shank causes excessive lateral pressure on the upper soil profile such that soil is simply displaced laterally rather than upward and laterally, which reduces the effectiveness of the implement to fracture the soil.

Ripper plough 10 as described above has been defined using the following angles:

Approach angle—5 degrees to 10 degrees. The rearward upward slope of the bottom of the shank. If the approach angle were negative, an inclined plane would be created that would tend to result in the plough being push upward out of the ground. If the approach angle were 0, the flat bottom of the plough would make it more difficult to push the plough deep into the soil. A range of 5 to 10 degrees has been found to provide the desired lift. At greater than 10 degrees, soil resistance increases and the plough begins to function like a boat anchor.

Coulter angle—140 degrees and ranging between 120 and 150 degrees. The obtuse angle between the upper forward face of the shank and the lower forward slope of the bottom of the shank where the foremost point engages the soil or supports a tooth that engages the soil. The coulter angle is not as critical as the other angles specified. A coulter angle of less than 120 degrees will tend to result in the plough penetrating the soil too far in advance of the plowshares and increase surface friction thereby making the plough more difficult to control. A coulter angle greater than 150 degrees increases resistance at the plough moves through the soil.

Plough angle—43 degrees and ranging between 40 and 55 degrees. The outward lateral extension of the lower soil-engaging edge of the ploughshare-base and ploughshare makes with the shank measured from the forward point of attachment extending outward as an acute angle toward the rear of the invention. When the angle is less than 40 degrees, the plough tends to slice through the ground without providing desired lift. When the angle is greater than 55 degrees, the plough creates excessive resistance.

Thrust angle—45 degrees and ranging between 40 and 50 degrees. The angle that the ploughshare-base and ploughshare slopes upward from the lower soil-engaging edge to where is joins the shank. The angle is measured perpendicular to the direction of travel. When the angle is less than 40 degrees, the plough tends to slice through the ground without providing desired lateral force on the soil. When the angle is greater than 50 degrees, the plough creates excessive resistance.

Lift angle—an average lift angle of 10 to 15 degrees. The lift angle is the average angle of the upward lift that the ploughshare imparts to the soil. The objective is to create a sustained strain at a soil depth of at least two and one half feet for the embodiment of the plough illustrated. In order to accomplish this, the ploughshares has a length between a leading edge and a trailing edge of at least 1.5 feet and the ploughshares are spaced apart at the trailing edge by at least two feet. It was initially believed that the length had to be at least two feet, but beneficial results have been obtained with a length as short as 1.5 feet.

Moldboard angle—approximately 50 to 60 degrees. The moldboard angle is measured at the rear of the element and perpendicular to the direction of travel. It is measured as the obtuse angle between the soil-engaging face of the element and the horizontal where the upper edge of the face is connected to the shank and the lower edge to the ploughshare-base outward from the shank. If the moldboard angle is less than 50 degrees, it does not generate desired lateral thrust. If the moldboard angle is greater than 60 degrees, it generates excessive lateral, thrust which turns the soil over and closes adjacent openings, rather than creating more openings in the soil.

The overall size of the unit will be defined by the designed depth for tilling soil, and the amount of strain that must be applied to soil cause it to fracture and break apart. For optimum tillage of the soil at other depths, the size of the unit can be scaled to an appropriate size using these angles. For the purposes of this description, "strain" can be defined as the increase in elevation of the soil as it passes over trailing edge of the soil-engaging surface of ripper plough 10 divided by the depth of soil between the surface and leading edge of the soil-engaging suite. Most values of tillage strain for conventional subsoilers that use wings and sweeps to produce the lift are estimated to be in the range of 0.05 to 0.10 (as expressed as a ratio of lift to depth or, if preferred, considered as percentage lift to depth—in this case 5% to 10%). The present invention produces strain in the range of 0.10 and 0.35. Values of strain greater than 0.30 occur if ripper plough 10 is operated with the low soil-engaging leading edge of the ploughshare closer to the soil surface. Cohesionless soils are effectively tilled regardless of soil wetness with a strain value of less than 0.15. Drier medium and fine textured soils with some evidence of natural soil structure can be tilled with a strain of 0.15 to 0.20. As soil water content increases, so does the strain required to fracture the soil. Similarly, as soils become more massive in structure, the strain required to fracture them also increases. Reclaimed soils that are relatively wet and massive in structure can require a strain approaching 0.30 to fracture.

As soil water content increases in medium and fine-textured soils, so does the size of the clods formed by tillage. But tillage does create large voids among the clods, which can allow other soil processes to be more effective in improving overall soil quality. In climates where soils typically freeze in winter; freezing of even large clods normally cause the clods to break into small pieces when they thaw, thereby improving the overall effectiveness of the tillage operation. Where a pair of ripper ploughs 10 have been operated on a medium-size bulldozer, ripper plough 10 has resulted in an average gain in soil elevation of 5 to 7 inches immediately after tillage under the following conditions: the bottom leading edge of the ploughshare is at 30 to 36 inches below the original soil surface, each ripper plough 10 is operated directly following the track of the bulldozer, ripper plough 10 spacing is approximately 80 inches, and a second pass of the bulldozer is made with the one track located between the location of the tracks from the first pass. Forty to 50 percent of the average gain in soil elevation is sustained by the end of the following summer if the site is not trafficked again by any equipment. The sustained gain in soil elevation provides additional soil porosity which can improve soil aeration, improves soil water storage capacity, increases hydraulic conductivity, reduces surface erosion, and improves the volume of soil available for plant growth.

Alternative Embodiments

While the preferred embodiments are defined as having an integral shank directly supporting the soil-engaging components of ripper plough 10 and its connection to the machine, an alternative embodiment of ripper plough 10 is to mount the soil engaging components to a metal frame shaped specifically to fit a variety of shanks commercially available for large bulldozers, excavators, tractors and the like. The metal frame functions much like a boot that slips on a foot, and in one version the boot is held on the shank by a wedging lock between the rearward frame of the boot and the rearward edge of a commercial shank. The wedging lock holds ripper plough 10 on the shank. The boot provides the frame for mounting all the original elements of ripper plough 10, including the soil-engaging point or tooth, the base, ploughshare-base and ploughshare, coulter, moldboard (if used), and appropriate bracing in the trailing portion of ripper plough 10. The boot style of ripper plough 10 may be more appropriate for larger machines and shanks.

In order to better demonstrate the invention, the follow example is provided.

Comparison of cross section of plough and ripper furrows of conventional tillage implements and the Ripper plough. Conventional tillage implements operated at depths between 0.4 and 0.55 meters, and more than three units are generally used at one time. The Ripper plough is mounted in pairs on a medium size dozer where the Ripper ploughs are spaced about 2.0 meters apart and operating at a depth of up to 0.9 meters.

FIGS. 9A through 9E illustrate PRIOR ART subsoilers.

Figures 9A, 9B, 9C, 9D, 9E:
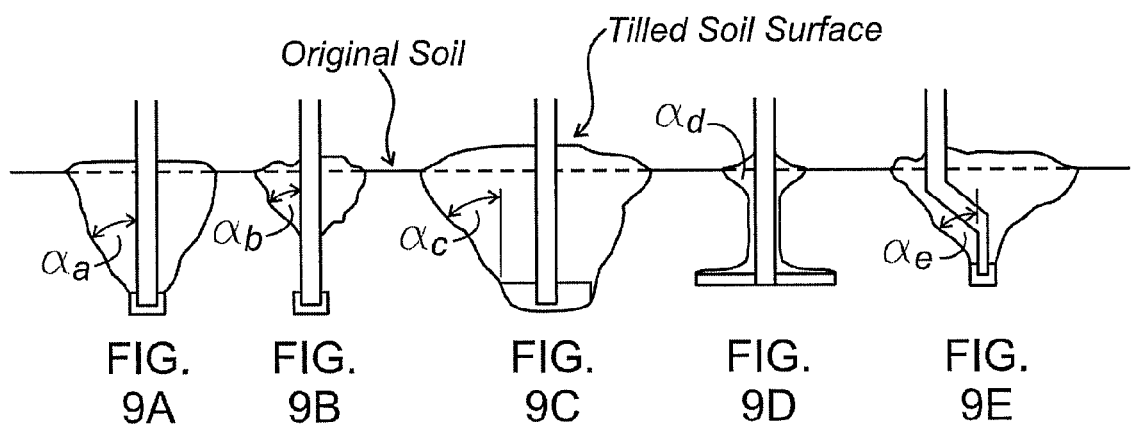
FIG. 9A-9E show examples of conventional subsoilers.

FIG. 9A shows a conventional ripper with simple tooth to engage soil and protect shank from excessive wear. Soil fractures in a 'V-shape' configuration whether in agricultural applications or in the use of ripper shanks on dozers.

FIG. 9b shows a conventional ripper operating in wetter, finer-textured soils where the deeper soil deforms around the shank and only fractures in a 'V-shaped' configuration closer to the surface.

FIG. 9c shows the addition of a wing to the bottom of a conventional shank laterally expands fracturing of the soil directly above the shank but generally does not change the angle of the fracturing to the surface because most wings attachments only lift the soil and provide minimal lateral thrust of the soil.

FIG. 9d shows a winged subsoiler operating in wet, finer-textured soil that does not provide the lift necessary to fracture the soil to the surface. As a consequence, the soil deforms around both the shank and wing with only a small amount of deformation occurring near the surface.

FIG. 9c shows a bent-leg subsoiler used in agriculture to provide some lateral thrust in the middle of the shank but the beneficial result is an asymmetrical fracturing of the soil closer to the surface.

Explanation of FIGS. 9A-9E:

Conventional soil tillage practices generally rely on the lift of the tooth engaging the soil as the primary means of fracturing the soil; the shank only provides the linkage between the tooth and the machine, and the means to control the tooth—for example the depth. Historically, implements to till subsoil have primarily relied on lifting of the soil by a tooth, wing, or inclined plate to fracture the soil. As stated by Hettiaratchi in a study conducted in 1988, " . . . in the vast majority of the instances only passive pressure is encountered and hence the discussion will dwell only on this form of earth pressure.".

Earth pressures in soil are based on the theory of Rankine (Terzaghi and Peck 1967). There are two types of earth pressures identified by Rankine; they are passive and active earth pressures. Passive earth pressures mean that lateral forces acting on the soil mass from a surface in contact with the soil are relatively low compared to the forces acting upward in the case of conventional tillage implements. As a consequence, the distribution of forces in soil tend to be more upward than outward, and equilibrium forces tend to occur at an angle from the horizontal of 45 degrees plus half the shear strength of the soil. Shear strength of soils typically range between 15 and 35 degrees. Hence, the zone of fracturing in soil tends to break upward at an angle between about 50 to 60 or more degrees. Referring to FIGS. 9A-C and 9E, all the alpha angles indicating the upward fracturing of the soil are greater than 45 degrees. These examples are typical of modern agricultural subsoilers and confirm that modern tillage implements continue to be based on passive earth pressure theory.

Figure 10:
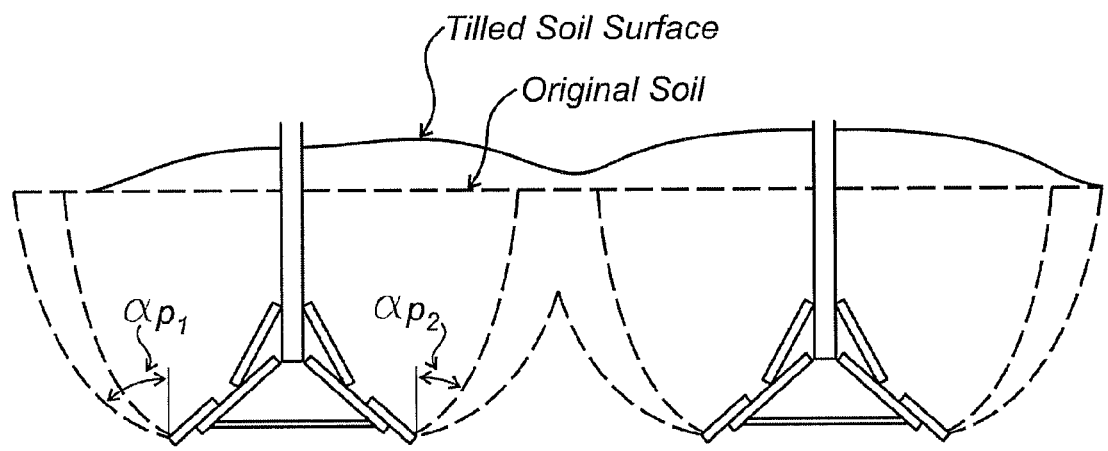
FIG. 10 shows the ripper plough from FIG. 1 tilling soil.

FIG. 10 discloses a parallel Ripper plough configuration in accordance with the present application The Ripper plough applies an upward as well as a lateral thrust in a subsoil plough for deep tillage of soil. The lateral thrust creates strong lateral forces in the soil, and these forces are even greater in drier soils. Lateral forces create active earth pressures according to the Rankine theory (Terzaghi and Peck 1967). As a consequence, the lateral forces away from the plowshare in a Ripper plough are equal to or greater than are the vertical forces. Therefore, an equilibrium force field is created outward from the face of the ploughshare at an angle of 45 degrees minus half the shear strength of the soil. Hence, the outward fracture surface of soil from a Ripper plough is at angles of 25 to 35 degrees from the horizontal, but curve upward to the surface. The outward forces are greater in drier soil than in wetter soil, hence, a larger volume of soil is loosened when the soil is drier. When drier soils have been ploughed with a pair of Ripper ploughs spaced at about 2 meters and operating at a depth of 0.9 meters, all the soil between the ploughs have been loosened to a depth of 0.4 to 0.5 meters. As a result, the volume of soil tilled by a Ripper plough extends laterally and upward in a 'U-shaped' pattern rather than a narrower 'V-shaped pattern of FIG. 9A-E. The bottom of the 'U' is the width of the trailing edge of the ploughshares, which for the Ripper plough illustrated is about 0.67 meters.

Lift Calculations.

The Ripper plough elevates the soil with the ploughshare from the underlying soil. Thus, the soil passing over the face of the Ripper plough is elevated by the tillage process; the increase in soil elevation, the total lift elevation, is the sum of the lift created by the approach angle and the lift angle created by the ploughshare.

Effects of the approach angle on lift elevation: The soil engaging bottom edge of the ploughshare is parallel to Ripper plough body, which in the prototype is a 5 degree downward tilt. Hence, the approach angle of the Ripper plough body creates a lift of approximately 0.05 meters for a ploughshare that is about 0.63 meters long in the direction of travel (Eqn 1 is solution of a right triangle).

Tangent of approach angle=(Lift from Approach)
Length of Ploughshare     Eqn 1

Rearranging the Equation:

$$\text{Lift from Approach} = \text{Length of ploughshare} \times$$
$$\text{tangent approach angle}$$
$$= 0.63 \text{ meters} \times \text{Tangent 5 degrees}$$
$$= 0.63 \text{ meters} \times 0.0875$$
$$= 0.055 \text{ meters}$$

Effects of the Lift angle on lift elevation: The ploughshare and ploughshare base is attached to the Ripper plough body so that the lower soil engaging edge is parallel to the body. The upper edge of the ploughshare base is attached to the side of the body rising at an angle of 23 degrees from the forward edge of attachment. Hence, lift of the soil resulting from the ploughshare and ploughshare-base passing through the soil varies from 0 to 23 degrees in the direction of travel, with an average lift of 11.5 degrees (average of 0 and 23 degrees). The ploughshare and ploughshare-base do not come to a point because of practical considerations, and because the soil is being lifted by the tooth in advance of the plowshare. Therefore, if the lines of the lower edge of the ploughshare and the upper edge of attachment of the ploughshare base are extended into space until they intersect in the x-y axes, the extension would add about 0.14 meters to the length of the ploughshare in the x-axis that is adding lift to the soil. Hence, the effective length of the ploughshare in creating lift in the soil is 0.77 meters. Equation similar to Eqn 1 can be used to calculate increase in soil elevation created by the average lift angle of 11.5 degrees Tangent of average lift angle=(Lift from Ploughshare)
Effective Length of Ploughshare     Eqn 2.

Rearranging the Equation:

$$\text{Lift from ploughshare} = \text{Effective Length of ploughshare} \times$$
$$\text{tangent average lift angle}$$
$$= 0.0.77 \text{ meters} \times \text{Tangent 11.5 degrees}$$
$$= 0.77 \text{ meters} \times 0.203$$
$$= 0.157 \text{ meters}$$

The total lift elevation is the sum of the elevations created by the approach angle and the lift angle of the ploughshare and ploughshare base perpendicular to the direction of travel. This value is approximately 0.21 meters for a Ripper plough with a ploughshare that is approximately 0.62 meters in length. When the Ripper plough is used on dozers that can tilt the Ripper plough body forward or backward in the direction of travel, the lift elevation can be increased or decreased from the calculated value of 0.21 meters. Higher lift elevations are needed to fracture wet soil and lower angles are effective in drier soil.

The average lift elevation of 0.21 meters is achieved across the trailing edge of the Ripper plough, which is approximately 0.68 meters wide for a Ripper plough with a body that is 0.076 meters wide and opposing ploughshares with a length of approximately 0.62 meters, and angles previously defined.

A Ripper plough with a lift elevation of 0.21 meters in the previous example was designed and tested to tilt soil at depths between about 0.75 and 0.90 meters. The lift elevation produces a soil deforming strain in soil, which can be defined as the ratio of the total lift elevation divided by the depth of tillage. For the Ripper plough described, the strain for tilling soil at a depth of 0.75 meters would be 0.21/0.75 for a strain of 0.28, and for tillage at a depth of 0.90 meters, the strain would be 0.21/0.90 or 0.23. Drier, finer-textured soils are readily fractured at a strain of 0.22, while wetter soils require a strain approaching 0.30. Higher strain ratios are also need to fracture severely impacted soils that have been heavily trafficked by large machines and trucks when the soil is wet.

The high strain ratios produced with Ripper ploughs are substantially greater than the ratios for deep subsoilers with wings. Where the ratios can be measured and calculated, the strain ratio ranges between about 0.06 and 0.15, but have generally been ineffective at tilling wetter soil at the designed depth because the soils deform around the subsoiler. Furthermore, the existing subsoilers do not provide any lateral thrust that increases the volume of soil that can be fractured at the bottom of the furrow (FIG. 10).

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope defined in the Claims.

What is claimed is:

1. A ripper plough for soil tillage comprising:
   a body having an upper mounting attachment end, a lower soil engaging end, a leading edge, a trailing edge, and opposed lateral sides;
   a pair of ploughshare supports extending from each lateral side of the body, from the leading edge and diverging toward the trailing edge of the ripper plough, to form an inwardly facing combined plough angle therebetween of between 40 degrees and 55 degrees, and each of the pair of ploughshare supports extending outwardly and downwardly, relative to the body, to form a thrust angle, formed between an inwardly and downwardly facing surface of the respective ploughshare support and the body, of between 40 degrees and 50 degrees; and
   ploughshares mounted on the ploughshare support, the ploughshares having a length between a leading edge and a trailing edge of at least 1.5 feet, being spaced apart at the trailing edge by at least two feet, and providing an average lift angle of upward lift of between 10 degrees and 15 degrees, and the average lift angle being an average angle of upward lift that the ploughshares impart to soil.

2. The ripper plough of claim 1, wherein a forward coulter is positioned along the leading edge between the upper mounting attachment end and the lower soil engaging end, the forward coulter having an angle of between 120 degrees and 150 degrees.

3. The ripper plough of claim 1, wherein a replaceable soil-engaging point is detachably secured to the lower soil engaging end of the body.

4. The ripper plough of claim 1, wherein the ploughshares are detachably secured to the ploughshare support.

5. The ripper plough of claim 1, wherein the ploughshare support includes a base plate and braces.

6. The ripper plough of claim 1, wherein a mouldboard is secured to the opposed lateral sides of the body and extends outwardly from the body from the leading edge toward the trailing edge and extending outwardly and downwardly relative to the body at an angle of between 50 degrees and 60 degrees.

7. The ripper plough of claim 1, wherein the body has a bottom edge with a downward slope from the trailing edge toward the leading edge of between 5 degree and 10 degrees.

8. The ripper plough of claim 1, wherein the body is a shank.

9. The ripper plough of claim 1, wherein the body is a boot adapted to slide over a shank.

* * * * *